No. 847,337. PATENTED MAR. 19, 1907.
A. F. HOOTON.
ELECTRICAL RAIL BOND.
APPLICATION FILED MAY 24, 1906.
2 SHEETS—SHEET 1.
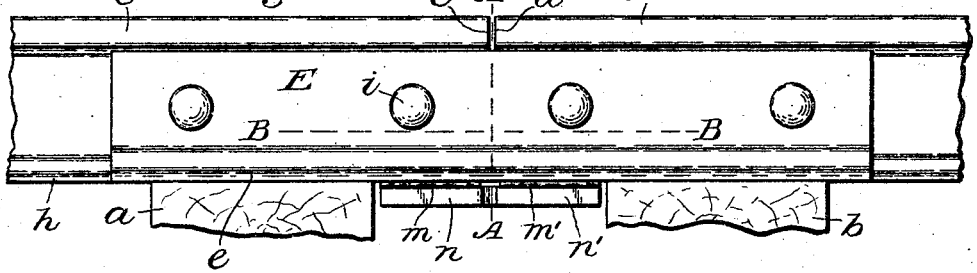
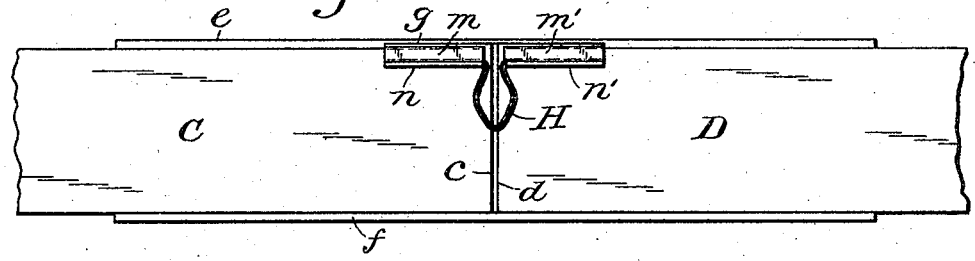
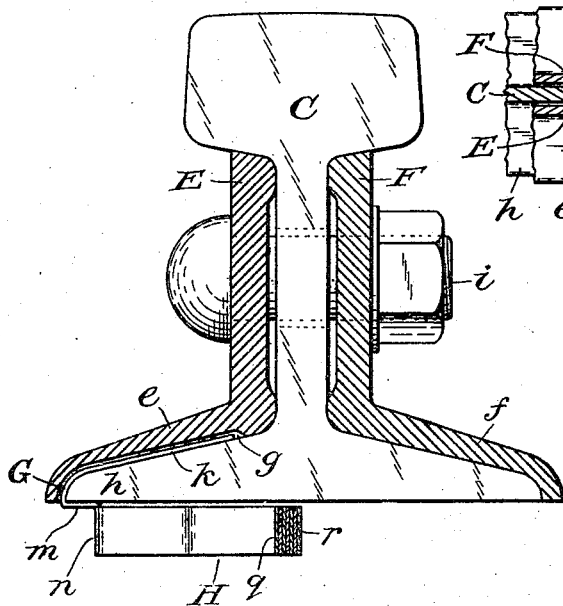
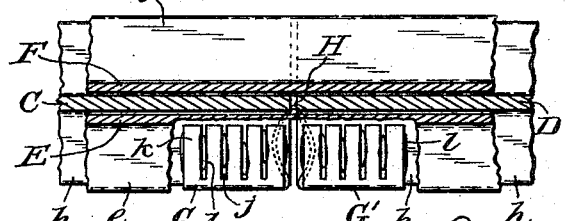
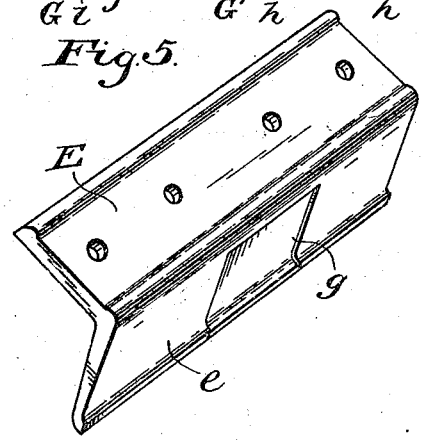
WITNESSES:
John Stone.
Stella Snider
INVENTOR:
Alonzo F. Hooton,
BY
E. T. Silvius,
ATTORNEY.

No. 847,337. PATENTED MAR. 19, 1907.
A. F. HOOTON.
ELECTRICAL RAIL BOND.
APPLICATION FILED MAY 24, 1906.
2 SHEETS—SHEET 2.
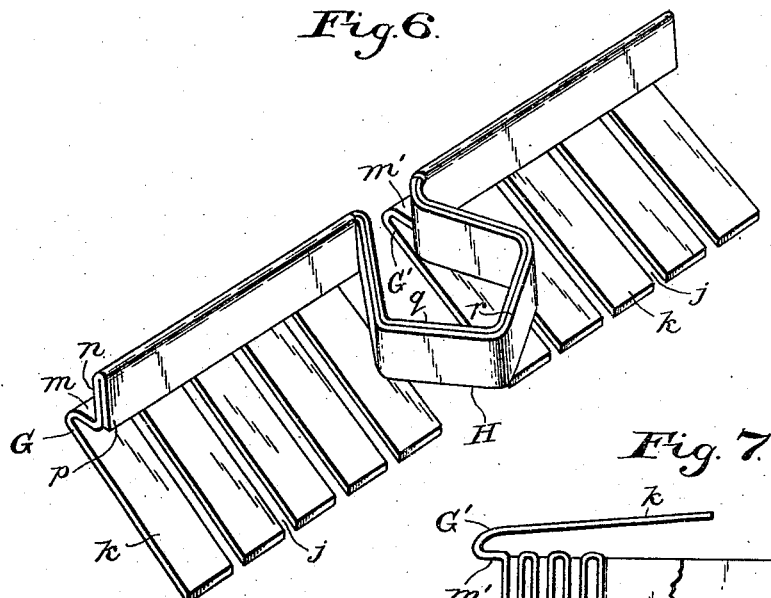
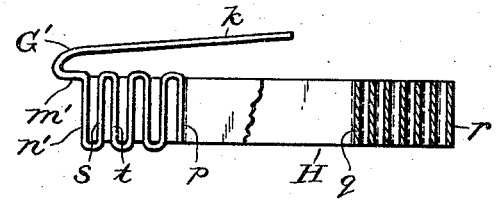
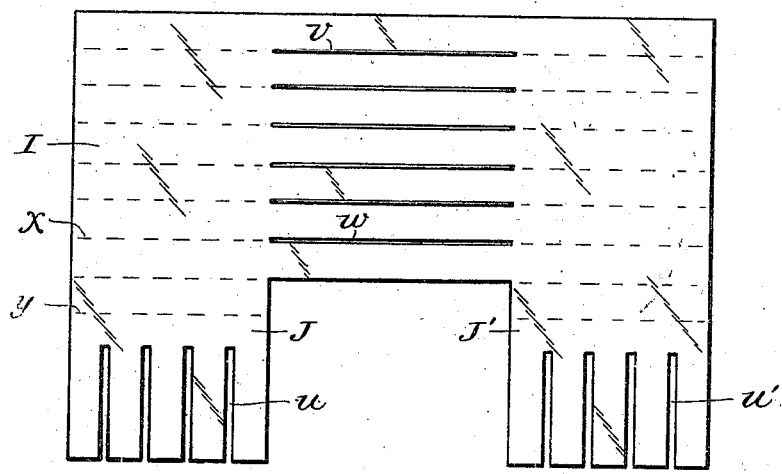
WITNESSES:
John Stone.
Stella Snider.
INVENTOR:
Alonzo F. Hooton,
BY
E. T. Silvius,
ATTORNEY.

UNITED STATES PATENT OFFICE.

ALONZO F. HOOTON, OF GREENFIELD, INDIANA.

ELECTRICAL RAIL-BOND.

No. 847,337.  Specification of Letters Patent.  Patented March 19, 1907.

Application filed May 24, 1906. Serial No. 318,455.

*To all whom it may concern:*

Be it known that I, ALONZO F. HOOTON, a citizen of the United States, residing at Greenfield, in the county of Hancock and State of Indiana, have invented new and useful Improvements in Electrical Rail-Bonds; and I do declare the following to be a full, clear, and exact description of the invention, reference being had to the accompanying drawings, and to the letters and figures of reference marked thereon, which form a part of this specification.

This invention relates to electrical conductors for railway-rail joints, and has reference particularly to the class of devices that are known as "rail-bonds," which conduct the electric current across the openings between rail ends more efficiently than can be accomplished by the splice-bars that connect the rails together.

Objects of the invention are principally to provide rail-bonds which may be effectively attached to the rails with ample contact area and which will insure intimate electrical connection with the rails, and thereby reduce leakage of current to the minimum, and to provide improved bonds which may be cheaply produced and permit of contraction and expansion of the rails without deterioration of the bonds, a further object being to provide improved rail-bonds and protection therefor, so that the bonds will not be liable when in use to be accidentally injured where the rails may not be laid in paved streets or where the rail-joints are exposed, durability and economy being the results sought.

The invention consists in a rail-bond having two contact-plates adapted to be attached to the tops of the base-flanges of the railway-rails, the plates preferably having openings therein to provide ample soldering edges, and the plates extend under the rail-flanges and have integral flanges of one or more layers or plates to which a loop is attached that is preferably laminated or composed of a plurality of loops one within another, the invention consisting also in a cover for protecting the contact-plates against fracture; and, further, the invention consists in the novel construction, in the novel parts, and the combinations and arrangements of parts, as hereinafter particularly described and claimed.

Referring to the drawings, Figure 1 is a fragmentary side elevation of railway-track at a joint thereof having the improved bond and protector applied thereto; Fig. 2, an inverted plan view thereof; Fig. 3, a transverse sectional view at the plane of the line A A in Fig. 1; Fig. 4, a horizontal sectional view on the line B B in Fig. 1; Fig. 5, a perspective view of the bond-protector formed as part of a splice-bar for the rails; Fig. 6, a perspective view of the improved bond; Fig. 7, an end elevation of a partly-formed bond composed of a single piece of metal, and Fig. 8 a blank from which the bond may be advantageously formed.

Similar reference characters in the several figures of the drawings designate corresponding elements or features.

In the drawings, $a$ and $b$ designate rail-ties on which contiguous rails C and D are supported, $c$ and $d$ indicating the ends of the rails at the joint.

E and F designate the splice-bars of the angle-bar type, having base-flanges $e$ and $f$. In the present invention the flange $e$ has a cavity $g$ in the under side thereof to receive the contact-plates of the bond, the other parts of the flange resting on the base-flanges $h$ of the rails, so that the flange $e$ serves as a cap to cover and protect the contact-plates and also serves as a part of the splice-bar. A similar separate cap, however, will be provided and suitably attached to the rail-flanges or to rail-ties in case it be preferred to use plain splice-bars without the flanges. The usual joint-bolts $i$ are employed.

The bond comprises two plates G and G', preferably of copper, that lie on the tops of the contiguous rail-flanges $h$, the latter being first made clean and free from scale. The plates have considerable area and are soldered fast to the rail-flanges, and in order to obtain the best results the contact-plates have suitable openings therein, such as slots $j$, that extend from an edge of each plate, thereby forming a plurality of projections $k$ integral with the contact-plate, and solder $l$ is attached to the sides of the projections and to the rail-flange, making a firm connection in addition to such soldering as may be done between the plates and the flanges and under the projections. The contact-plates extend over and under the edges of the rail-flanges $h$ and have return-flanges $m$ and $m'$, extending somewhat under the flanges of the contiguous rails near the ends thereof, and other flanges $n$ and $n'$ are attached to the flanges $m$ and $m'$, respectively, and extend approximately at right angles thereto downwardly under the rail-flanges, the flanges, as $m$ and $n$, serving as strong angle-bars for conducting the current that may have been collected by the contact-plates. The flanges $n$ and $n'$ are preferably laminated or provided with additional plates or strips $p$ of any desired number and attached to the flanges in any suitable manner. A loop H is attached to the adjacent ends of the flanges $n$ and $n'$ and extends under the rail-flanges and across the opening between the rails, the loop being flexible, so as to readily yield when the flanges $n$ and $n'$ move with the expanding or contracting rails. The loop is preferably composed of a plurality of strips, as $q$ and $r$, fitted closely together, but attached only at their ends, where attached to the flanges $n$ and $n'$, so that the flexibility may be attained in the highest degree.

As preferably constructed the bond has additional plates or strips, as $s$ and $t$, formed by doubling over parts of a single plate of metal, the strips extending throughout the loop H, but severed at their edges, as in Fig. 7, where the strips are slightly spread apart to clearly show their continuity, the loop being partly in section and a portion thereof broken away.

The blank from which the bond is preferably formed comprises a plate I, that has two projections J and J', of which the contact-plates are formed, there being slots $u$ and $u'$ in the respective projections of the blank whereby the projections $k$ are to be formed. In the body of the blank-plate I are a plurality of slits, as $v$ and $w$, extending at right angles to the slots $u$ and $u'$. The plate I is to be bent over upon itself at the broken lines $x$, that aline with the slits $v$ and $w$, to form the laminated flanges $n$ and $n'$, the parts between the slits to form the laminated loop H. The projections J and J' are to be bent over at and near the broken line $y$ to form the flanges $m$ and $m'$ and the curved parts of the contact-plates that extend over the edges of the rail-flanges $h$.

In practical use, as above mentioned, the relatively large contact-plates will either one effectually collect or concentrate the current and conduct it to the angle-bar flanges $m$ and $n$, while the loop will have ample capacity to conduct the current to the other flanges $n'$ and $m'$, or vice versa. The movements of the cap or flange $e$ will not break the contact-plates' connections.

Having thus described the invention, what is claimed as new is—

1. A rail-bond comprising two contact-plates having each a curved portion and an angle-bar extending from the curved portion, and a loop extending from the angle-bars, all formed integral.

2. A rail-bond comprising two flat contact-plates having each a plurality of angle-bars laid together, all formed integrally, the angle-bars of the two plates being in alinement longitudinally and spaced apart, and a loop connecting adjacent ends of the angle-bars.

3. A rail-bond comprising two contact-plates each having an integral angle-bar flange, the plates being adapted to lie upon the tops of rail base-flanges, and the angle-bar flanges adapted to be supported by the plates under the base-flanges, a loop connecting the angle-bar flanges, and a cover for the contact-plates adapted to rest on the base-flanges for support.

4. A rail-bond comprising two plates having edge portions doubled over and forming angle-bar conductors having each a plurality of contiguous layers, and a loop formed integral with the layers of the angle-bar conductors and comprising a plurality of strips.

5. A rail-bond including a pair of contact-plates having each a curved portion to which is attached a flange composed of a plurality of plates, and a loop attached to the plurality of plates of both of the flanges.

6. A rail-bond including a pair of plates formed with openings therein and bent over to form angle-bars, portions of the angle-bars being doubled over and forming a plurality of thicknesses of material, and a loop formed of a plurality of separate plates integrally attached to the several parts of both of the doubled-over portions of the angle-bars.

7. A blank for forming a rail-bond comprising a flexible plate having two projections in which are openings to comprise contact-plates with augmented soldering edges, the body of the plate having a plurality of slits therein for forming separate looped conducting-plates, portions of the body being imperforate to form folded-over conductors connecting the looped conducting-plates with the contact-plates.

In testimony whereof I affix my signature in presence of two witnesses.

ALONZO F. HOOTON.

Witnesses:
EDWIN T. GLASCOCK,
WM. F. McBANE.